United States Patent [19]

Yang et al.

[11] Patent Number: 4,460,613

[45] Date of Patent: Jul. 17, 1984

[54] BASAL MATERIAL FOR THE PREPARATION OF TOFU

[75] Inventors: Angel A. Yang, Crestwood; Robert J. Vander Zanden, Manchester, both of Mo.

[73] Assignee: Ralston Purina Company, St. Louis, Mo.

[21] Appl. No.: 438,111

[22] Filed: Nov. 1, 1982

[51] Int. Cl.$^3$ ............................ A23D 5/00; A23J 3/00
[52] U.S. Cl. ...................................... 426/601; 426/613; 426/634; 426/573; 426/656
[58] Field of Search ............... 426/573, 634, 656, 601, 426/613

[56] References Cited

U.S. PATENT DOCUMENTS

| | | | |
|---|---|---|---|
| 3,852,503 | 12/1974 | Magnino et al. | 426/656 X |
| 3,943,266 | 3/1976 | Halik et al. | 426/656 |
| 4,176,202 | 11/1979 | Decker et al. | 426/656 X |
| 4,278,597 | 7/1981 | Cho et al. | 426/656 X |
| 4,309,344 | 1/1982 | Walsh | 426/634 X |
| 4,360,537 | 11/1982 | Tan et al. | 426/573 X |

FOREIGN PATENT DOCUMENTS 115844 10/1978 Japan .................................. 426/634

*Primary Examiner*—Robert A. Yoncoskie
*Attorney, Agent, or Firm*—Virgil B. Hill

[57] ABSTRACT

A process for the production of a dried basal material used for the preparation of a soy based cheese food particularly tofu is set forth wherein a slurry of a soy protein material is formed followed by heating such slurry to a temperature of at least about 220° F. and the retention of such slurry in heated condition under positive pressure for at least a few seconds up to about a few minutes. Following heating of the slurry, the slurry is cooled and mixed with an edible oil which is added to said portein material in an amount sufficient to improve the whiteness of products which are produced with the basal material. The oil is preferably added to said soy material in a proteinaceous solids to oil ratio of between about 5 to 0.2:1. The mixture of oil and soy protein material is dewatered preferably by spray drying and then blended with other ingredients of a basal mix thereby forming a basal material for the production of soy cheese or tofu which has unusual characteristics. The present process provides an easy means of forming a starting material for tofu or soy cheese with an improved degree of whiteness over prior art starting materials and of a comparable texture to conventionally produced tofu or soy cheese.

20 Claims, No Drawings

BASAL MATERIAL FOR THE PREPARATION OF TOFU

BACKGROUND OF THE INVENTION

The present invention relates to a dried basal material used for the preparation of a soy based cheese food, particularly tofu as well as a method of forming the basal material.

Tofu is a soft cheese prepared from vegetable protein materials and has been widely used as a proteinaceous foodstuff in the Orient. Increasing familiarity with this type of food product in Western societies has increased the worldwide demand for this type of product. Tofu is conventionally produced by first washing whole soybeans with water to remove residual dirt or contamination followed by immersion and soaking of the soybeans in water for an extended period of time. Soaking of the soybeans in water results in swelling of the beans and this is followed by grinding, milling or comminuting the swollen soybeans into a smooth, thick, white puree or paste. The ground soybeans are then heated to inactivate trypsin inhibitors, increase nutritional value, improve flavor and increase the storage life of the final product. After the soybeans are heated, they are filtered and a soy milk is obtained which becomes the basal material for preparation of the tofu or soy cheese.

The tofu itself is actually prepared by the addition of a coagulant such as an acidic salt and the like to the soy milk to coagulate and precipitate the tofu. The tofu, as desired, may be subjected to further freezing and processing for texturization depending upon the particular characteristics desired.

It may be seen that the preparation of tofu is a relatively tedious and laborious process requiring a great deal of skill upon the part of workers involved in the preparation of this type of product. It would therefore be highly desirable for ease of manufacture to employ as the starting material for the tofu, a dried basal material which could readily and easily be dispersed in water for the formation of tofu in a conventional manner.

Such a dried product is generally described in U.S. Pat. No. 3,943,266 wherein whole soy milk is spray dried to provide a base material which can be ultimately used for the preparation of a soy cheese food product such as tofu. While such a product offers an advantage of convenience to a user, nevertheless, it suffers from several deficiencies. Often, the use of a dried base material for the preparation of a soy cheese product such as tofu results in a tofu product which is not as white as conventionally prepared tofu and often does not have the desirable smoothness. Accordingly, it would be advantageous if a dried base for the preparation of a soy cheese or tofu like product could be prepared which overcomes these deficiencies and offers the advantages of convenience and speed in the preparation of tofu or a soy cheese product.

These deficiencies have been overcome in the present invention by providing a unique process for the preparation of a dried soy cheese or tofu base which can be conveniently dispersed in water and used for the preparation of a soy cheese or tofu like product. Soy cheeses or tofu like products produced from the base material of the present invention have a significant improvement in whiteness over spray dried, whole soy milk products of the prior art which have heretofore been used for the preparation of tofu or soy cheese products. Tofu products produced with the base material of the present invention further have been determined to have a smoothness or texture that is more comparable to conventionally produced tofu.

It is therefore an object of the present invention to produce a base material which can be used for the preparation of a soy cheese or tofu-like product.

It is a further object of the present invention to provide a process for the production of a base material used for the preparation of soy cheese or tofu wherein a significant improvement in whiteness of tofu prepared from the base material is obtained.

It is a still further object of the present invention to provide a process for the production of a base material wherein a soy cheese or tofu like product can be obtained having a comparable degree of smoothness or texture to that obtained with a conventionally prepared tofu or soy cheese.

SUMMARY OF THE INVENTION

The present invention relates to a process for the production of a dried soy cheese or tofu base to provide tofu or soy cheese products of improved whiteness and texture comprising forming a slurry of a soy protein material. The slurry is heated to a temperature of at least about 220° F. and retained in the heated condition under positive pressure for a few seconds up to a few minutes to subject the slurry to a vigorous degree of heating and pressure. The heated slurry is then ejected from a positive pressure into an environment of lower pressure to substantially cool the slurry. Following cooling of the slurry, the slurry of the vegetable protein material is blended with an edible oil in an amount effective to improve the whiteness of tofu products produced with the base material. Preferably, the oil is blended in an amount such that said slurry has a protein solids to oil ratio of between about 5 to 0.2:1. These and other specific advantages of the present invention will be apparent from the following detailed description set forth below. The slurry is then dewatered or dried followed by blending of the dried or dewatered slurry with additional basal ingredients such as carbohydrates to form a dried soy cheese or tofu base which can be easily dispersed in water and used to form a soy cheese product or tofu in a conventional manner.

The unique aspect of the present invention involves the order of addition of the various ingredients in preparation of the soy cheese or tofu base and the manner in which these ingredients are treated to achieve the resultant improvement in whiteness and texture. Specifically, the improvement resides in initial formation of a slurry of a soy protein material followed by cooking and treatment of the slurry prior to the addition of the edible oil, then drying the mix of vegetable protein material and edible oil before adding the remaining ingredients of the soy cheese base or tofu mix. This unexpectedly produces products of an improved degree of whiteness and of a desirable texture as compared to the use of whole spray dried soy milk as the starting material wherein the protein material and fat are naturally combined. The whiteness of the products of the present invention are also superior as compared to a process wherein all the ingredients of the tofu mix or the soy cheese base are dry blended.

DESCRIPTION OF THE PREFERRED EMBODIMENTS

The dried soy cheese or tofu basal material of the present invention is formed by a process which initially comprises forming a slurry of a soy protein material. The particular type of soy protein material used in forming the initial slurry of the present invention may be either a soy flour, soy concentrate or preferably an isolated soy protein. For purposes of explanation in the context of the present invention, an isolated soy protein material is conventionally prepared by the treatment of defatted soybean flakes with an alkaline solution which solubilizes the protein. The protein is then separated from the alkaline insoluble solids by filtration or centrifugation. The proteinaceous solution is subsequently precipitated in the form of a curd by adjustment of the pH of the solution to the isoelectric point of the protein which is usually between about 4 and 4.5 in the case of soy protein. The curd obtained by isoelectric precipitation of the solubilized soy protein is the preferred material for use in forming the initial slurry for purposes of the present invention. It is apparent, however, that equal success may be obtained by the use of a dried soy isolate wherein the dried material is simply used to form the slurry by mixing with water. For purposes of economy and use of manufacture, the curd obtained by precipitation of the solubilized soy protein at the isoelectric point is preferred as the starting material for the present invention.

The soy protein material is formed into an aqueous slurry and preferably an aqueous slurry having a proteinaceous solids content of between about 3 to 30% by weight, preferably between about 5 to 17% by weight with a most preferred range of 12 to 16% by weight. The slurry of soy protein material is then heated to a temperature of at least about 220° F. and preferably to a temperature of between about 220°-400° F. wherein said slurry is retained in this heated condition under a positive pressure for a period of time which amounts to at least a few seconds up to a few minutes. Generally speaking, the preferred temperature should be about 285°-320° F. for best results. A preferred apparatus for use for achieving the noted heating under positive pressure is a jet cooker which includes adjacent jet nozzle orifices normally concentric to which the slurry and pressurized steam which is used as the heating agent for the slurry are ejected at high velocity in intersecting flow patterns to dynamically heat the slurry and provide the desired level of heating for purposes of the present invention. The heated slurry is then ejected into a special retention chamber which may comprise an elongated tube through which the intermixed slurry and steam moves from the jet nozzle on one end of the tube to a pressure control discharge on the other end. This discharge can be controlled by conventional preset pressure release valve to enable continuous process flow from the nozzle to an outer discharge valve. The chamber pressure must be great enough to prevent a significant vaporization of moisture in the chamber even though the temperature is well above the boiling point of water. A pressure of about 75-80 psig readily achieves this.

The steam heated slurry is then retained in the holding chamber for a definite but relatively short period of time consisting of comprising a few seconds up to a few minutes normally between 7 to 100 seconds.

The heated slurry is then cooled which preferably comprises discharging the slurry into a reduced pressure zone containing a suitable receiving means. This ejection of the slurry into a zone of reduced pressure causes substantial cooling of the slurry because of the heat of vaporization absorbed from the slurry and generally produces a slurry which has been cooled to a temperature in the order of 130° to 140° F.

At this point, the slurry can optionally be dried prior to the remainder of the process being performed although this is not preferred. If in fact, the slurry is dried prior to the balance of the process being carried out, it is reslurried prior to the following steps which are described in detail below.

The heated and cooled slurry is then mixed with an edible oil, said oil being added to said cooled slurry in an amount sufficient to improve the whiteness of the basal material as well as tofu or cheese like products ultimately produced with the basal material. It is preferred that the level of proteinaceous solids to oil ratio be between about 5 to 0.2:1 by weight. A most preferred level of proteinaceous solids to oil comprises about 2:1 by weight. The particular type of edible oil which may be employed in the present invention is not critical to the practice of the present invention and may comprise any suitable vegetable oil such as soybean oil, peanut oil, safflower oil, sunflower oil or other vegetable oils. It is important for purposes of the present invention relative to the improvement in whiteness of tofu products produced with the basal material of the present invention that the oil be blended with the slurry prior to drying and prior to blending of additional materials normally prepared in a tofu or soy cheese basal mix. This provides the tofu or soy cheese products produced with the basal material of the present invention with a level of whiteness which is comparable to that obtained in the conventional production of tofu but far superior to the use of a dried basal material such as spray dried whole soybean milk.

The oil and cooled slurry of soy protein materials are preferably blended in a homogenizer to provide a uniform dispersion preferably wherein said homogenizer is operated at a pressure of between about 2000 to 3000 psi. This provides the required degree of emulsification of the edible oil and protein dispersion for purposes of drying.

Following mixing of the edible oil and slurry of soy protein material, the mixture is dewatered or dried and preferably the material is flash dried because of the uniform fine product normally obtained. Furthermore, the use of flash drying techniques provides an economical, continuous processing method and also contributes to the excellent dispersibility characteristics of the dried soy cheese or tofu basal material of the present invention. Of the flash drying techniques available, spray drying is preferred although other types of drying may also be employed such as drum drying, tray drying and the like.

After flash drying of the mixture, additional ingredients are added to the soy protein oil mixture to provide a basal mix for the preparation of soy cheese or tofu products. The exact ingredients which are added to form the basal mixture of the present invention is not critical to its practice and comprise conventional materials that would be used in the preparation of a dried tofu basal or starting material such as carbohydrate mixtures and the like. It is preferred for purposes of the present invention that the carbohydrates comprise at least a sugar or starch such as a dextrin or maltodextrin and the like to provide the desired degree of dispersibility and uniformity of dispersion required for ultimate production of the soy cheese or tofu products. Additionally, such other flavorings, dispersing agents and other materials may be added as desired to influence the flavor or taste of the ultimate product or its ease of dispersion in water in order to make a tofu like product. Following preparation of the basal material, the tofu or soy cheese product is prepared in a conventional manner by dispersion in water followed by the addition of a coagulant such as an acidic salt to precipitate the solids in the form of a mass which is then pressed from the mixture to be otherwise treated and processed for sale and used as a soy cheese or tofu product. As previously noted, it is unique that the basal material formed according to the process set forth in the present invention provides tofu or soy cheese products having an unusual degree of whiteness over products produced from materials such as spray dried whole soy milk and yet has the required degree of smoothness or texture as would be normally found in the elaborate and conventional process for the production of tofu directly from whole soybeans.

The following examples represent specific but non-limiting embodiments of the present invention and illustrate the degree of improvement achieved in the process of the present invention over the prior art.

EXAMPLE 1

300 pounds of isolated soy protein curd which is the acid precipitated fraction from the alkaline extraction of defatted soy flakes having a pH of 7.0 and a total solids level of 14.5% by weight was passed through a jet cooker under a back pressure of 80 psig. The steam heats the isolated soy protein slurry to a temperature of 310° F. After 8 seconds, progressive portions of the heated slurry are discharged into a vacuum chamber maintained at 24–25 inches of Mercury to flash cool the heated slurry to a temperature of 130°–140° F.

One portion of the slurry designated was spray dried and then dry blended with the following ingredients to make a tofu basal mixture, designated as Sample A.

| Ingredient | % by Weight of Mixture |
| --- | --- |
| Spray Dried Soy Isolate | 53.30 |
| Safflower Oil | 26.60 |
| Maltodextrin | 13.30 |
| Fructose | 6.71 |
| Vanilla Flavor | 0.09 |

Another portion of the slurry was mixed on a wet basis with the following ingredients and then spray dried to make a tofu basal mixture designated as Sample B.

| Ingredient | % by Weight |
| --- | --- |
| Acid Precipitated Soy Curd | 88.75 |
| Safflower Oil | 6.42 |
| Maltodextrin | 3.21 |
| Fructose | 1.62 |
| Vanilla Flavor | 0.0002 |

A third portion of the slurry was mixed with safflower oil only on a wet basis, in the following amounts.

| Ingredient | % by Weight |
| --- | --- |
| Acid Precipitated Curd | 93.24 |
| Safflower Oil | 6.76 |

The mixture of curd and oil was spray dried and mixed with the following ingredients to make a tofu basal mixture designated as Sample C.

| Ingredient | % by Weight |
| --- | --- |
| Spray Dried Curd and Oil | 79.90 |
| Maltodextrin | 13.30 |
| Fructose | 6.70 |
| Vanilla Flavor | 0.10 |

These three samples of tofu basal mix were then used to prepare tofu by taking 70 g of each dry mixture and dispersing in 450 ml of water in a pan. The mixture of water and basal mix was brought to a boil, followed by addition of 3 grams of glucono delta lactone as a coagulant for the tofu. A sample of each mix was poured into a cup and allowed to stand until firm. An evaluation of the texture and whiteness of the tofu gel was made by the following procedures and with the results set forth in Table 1 below.

TABLE 1
Comparison Of Tofu Gels - Alternate Means of Processing

| Sample | Process of Making | Whiteness | Gel Hardness (gm) |
| --- | --- | --- | --- |
| A | Dry Blending Of All Ingredients | 3 | 29.1 |
| B | Wet Blending Of All Ingredients | 2 | 23.35 |
| C | Wet Blending Protein Solids And Oil | 1 | 33.98 |

Whiteness was evaluated on a subjective basis by visual comparison of the tofu gel of each sample and three samples were as 1, 2 or 3 on a scale of 3 with 1 being the whitest. These results are set forth in Table 1.

Texture of each tofu gel was measured using a Universal Instron Testing Machine with 2 inches/min. crosshead speed and 5 inches/min. chart speed, using an instron probe measuring 0.5 inches in diameter wherein the gel strength is the force necessary to fracture the surface of the gel. Samples of the gel were made in cups about 2 inches tall and about 2 1/16 inches in diameter. It may be seen from the above data that the best tofu gels, particularly insofar as whiteness were obtained when the edible oil was added to the slurry prior to drying and prior to addition of the carbohydrate mix. Less desirable color was obtained when the fat and the carbohydrate mix were added together to the slurry prior to drying. The poorest product was obtained by dry blending of the ingredients of the tofu product. An examination of gel hardness as measured on the Instron also indicates the best results were obtained by addition of the oil prior to drying of the slurry and the addition of the carbohydrate mix.

EXAMPLE 2

A portion of the heated and cooled slurry of soy isolate from Example 1 was blended with safflower oil in a protein solids to oil weight ratio of 2 to 1. The slurry of protein/oil had a solids level of 13.7% and was spray dried.

A second portion of the heated and cooled slurry of soy isolate from Example 1 was blended with safflower oil in a protein solids to oil weight ratio of 1 to 1. The slurry of protein/oil had a solids level of 13.5% and way spray dried.

A third portion of the heated and cooled slurry of soy isolate from Example 1 was blended with safflower oil in a protein solids to oil weight ratio of 5:1. The slurry of protein/oil had a solids level of 13.2% and was spray dried.

A fourth portion of the heated and cooled slurry of soy isolate from Example 1 was blended with safflower oil in a protein solids to oil weight ratio of 1 to 2. The slurry of protein/oil was spray dried.

A fifth portion of the heated and cooled slurry of soy isolate from Example 1 was blended with safflower oil in a protein solids to oil weight ratio of 1 to 5. The slurry of protein/oil had a solids level of 12.2% and was spray dried.

Each of the above samples were mixed with 1 part of maltodextrin to make a tofu mix and tofu gels prepared as described in Example 1. Each of the gels were evaluated for whiteness on a Hunter Lab Colorimeter, wherein the color of the dry mix was measured by comparative readings on the "L" scale, wherein 70 g of the dry mix was used for the tests. The "L" scale values being indicative of the whiteness of the sample. A tofu gel was also prepared from each dry mix as described in Example 1 and evaluated for gel strength on a gel tester Model 07-11 No. 225, sold by Marine Colloids, Inc., Springfield, N.J. using a plunger 1.2 cm in diameter.

The results of these tests are set forth in Table 2.

TABLE 2

Color And Textured Evaluation of Tofu Mixes At Different Protein/Oil Ratios

| Sample | Protein/Oil Weight Ratio | "L" Scale Reading Hunter Colorimeter | Gel Strength (g) |
|---|---|---|---|
| 1 | 2 to 1 | 58.2 | 244 ± 4.2 |
| 2 | 1 to 1 | 53.9 | 264 ± 11.0 |
| 3 | 5 to 1 | 44.8 | 266 ± 7.2 |
| 4 | 1 to 2 | 52.3 | 243 ± 15.3 |
| 5 | 1 to 5 | 50.4 | 258 ± 17.0 |
| Control[1] | 2 to 1 | 41.5 | 249 ± 16.8 |

[1]Dry Blend of 4 parts of dried soy isolate, 2 parts of safflower oil, 1 pat of maltodextrin Although all of the above products including the control generally made acceptable gels, the whiteness was most improved when something other than a dry blend was prepared and when the protein solids to oil weight ratio was between 2:1 to 1:2.

EXAMPLE 3

A spray dried tofu powder prepared from "whole" soybean milk as generally described in U.S. Pat. No. 3,943,266 was prepared as follows:

100 pounds of whole soybeans were soaked in 800 pounds of water at 35° F. for 15 hours. The water was removed by draining. An additional 700 pounds of water heated to 200° F. was added and the mixture ground for 10 minutes to form a "mash".

The mash is then heated to 212° F. and held at this temperature for 30 minutes to extract a soy "milk". The soy milk containing protein, carbohydrate and fat is separated from the insoluble solids by centrifugation. The residue of insoluble solids is re-extracted with 150 pounds of water and reheated at 212° F. for 30 minutes to extract additional soy milk.

The soy milk extracts are combined and heated to 160° F. with steam. 4 pounds of calcium sulfate in 50 pounds of water is added to the whole soy milk to precipitate the curd for 30 minutes. During precipitation, the tank contents are generally stirred and residual curd washed from the walls by a wash of 35 pounds of water.

The precipitated curd is separated from the whey by centrifugation and the curd is washed with water a total of 3 times using a ratio of water to curd of 6 to 1. The curd is diluted to a solids level of 10–15% total solids and spray dried.

The spray dried powder produced as described above was then evaluated for color as compared to a spray dried sample of the product produced by a process comparable to that employed for Sample C in Example 1. The results were measured on a Hunter Colorimeter and are set forth in Table 3 below.

TABLE 3

| | Hunter Colorimeter Readings | | |
|---|---|---|---|
| | L | a | b |
| Spray Dried Product From U.S. 3,943,266 | 81.6 | −0.3 | 14.6 |
| Spray Dried Product- Sample C of Example 1 | 89.4 | −1.4 | 10.4 |

It may be seen that the product of the present invention was much whiter as measured by the higher "L" scale reading on the Hunter Colorimeter.

The product of U.S. Pat. No. 3,943,266 and that of Sample C, Example 1 were also evaluated for making a tofu product wherein 70 g of each dry mix was added to 430 g of water and blended in a blender for 30 seconds. The mixture was then heated to boiling. The boiling mixture was removed from the heat and 3 g of glucono-delta-lactone was added as a coagulant. The warm mixture was poured into a mold and allowed to set up. A firm, smooth gel was obtained from the powder of Sample C, Example 1 whereas a gritty precipitate instead of a smooth gel was obtained when the powder of U.S. Pat. No. 3,943,266 was employed. It may be seen that tofu made with the product of the present invention has improved properties over the spray drying of a whole soybean milk as described in U.S. Pat. No. 3,943,266.

These Examples provide specific and non-limiting embodiments of the present invention and it is intended to include within the scope of the present invention all equivalent variations and modifications hereof.

What is claimed is:

1. A process for producing a dried soy cheese basal material comprising:
   a. forming a slurry of a material selected from the group consisting of soy flour, soy concentrate and soy isolate,
   b. heating said slurry to a temperature of at least about 220° F. and retaining said slurry in heated condition under positive pressure for between about 7 and 100 seconds;
   c. cooling said slurry;
   d. mixing an edible oil with said cooled slurry, said oil being added in an amount sufficient to improve the whiteness of soy cheese products produced with said basal material;
   e. dewatering said mixture and blending said dewatered mixture with a carbohydrate mix to provide a dried soy cheese basal material.

2. The process of claim 1 wherein the edible oil is added to said slurry in a weight ratio of protein solids to oil of between about 5 to 0.2:1.

3. The process of claim 2 wherein the protein solids to oil ratio is between about 2:1 to 1:2.

4. The process of claim 1 wherein dewatering is carried out by spray drying.

5. The process of claim 1 wherein said slurry prior to heating has a solids level of between about 3 to 30% by weight.

6. The process of claim 1 wherein said slurry is heated to a temperature of between about 220°–400° F.

7. The process of claim 1 wherein said slurry is heated to a temperature of between about 285°–320° F.

8. The process of claim 1 wherein said slurry is cooled to a temperature of between about 130° to 140° F.

9. The process of claim 1 wherein said edible oil is a vegetable oil.

10. The process of claim 1 wherein said carbohydrate mix comprises a sugar and starch.

11. A process for producing a dried tofu basal material comprising:
   a. forming a slurry of a material selected from the group consisting of soy flour, soy concentrate and soy isolate;
   b. heating said slurry to a temperature of between about 220° F.–400° F. and retaining said slurry in a heated condition under positive pressure for between about 7 and 100 seconds,
   c. cooling said slurry,
   d. mixing an edible oil with said cooled slurry, said oil being added to said slurry in a weight ratio of protein solids to oil of between about 5 to 0.2:1,
   e. dewatering said mixture and blending said dewatered mixture with a carbohydrate mix to provide a dried tofu basal material.

12. The process of claim 11 wherein dewatering is carried out by spray drying.

13. The process of claim 11 wherein said slurry prior to heating has a solids level of between about 3 to 30% by weight.

14. The process of claim 11 wherein the weight ratio of protein solids to oil is between about 5 to 0.2:1.

15. The process of claim 11 wherein said slurry is heated to a temperature of between about 285°–310° F.

16. The process of claim 1 wherein said slurry is cooled to a temperature of between about 130°–140° F.

17. The process of claim 11 wherein said edible oil is a vegetable oil.

18. The process of claim 11 wherein said carbohydrate mix comprises a sugar and starch.

19. The product produced by the process of claim 1.

20. The product produced by the process of claim 11.

* * * * *